(12) United States Patent
Bandringa et al.

(10) Patent No.: US 7,800,049 B2
(45) Date of Patent: Sep. 21, 2010

(54) ADJUSTABLE LOW VOLTAGE OCCUPANCY SENSOR

(75) Inventors: John Bandringa, Everett, WA (US); Danilo F. Estanislao, Old Bridge, NJ (US); Adam Kevelos, Plainview, NY (US); Nehal Shah, Westbury, NY (US); Paul Soccoli, New Hyde Park, NY (US); Edward Uftring, Syosset, NY (US)

(73) Assignee: Leviton Manufacuturing Co., Inc., Melville, NY (US)

( * ) Notice: Subject to any disclaimer, the term of this patent is extended or adjusted under 35 U.S.C. 154(b) by 578 days.

(21) Appl. No.: 11/466,070

(22) Filed: Aug. 21, 2006

(65) Prior Publication Data

US 2007/0040676 A1 Feb. 22, 2007

Related U.S. Application Data

(60) Provisional application No. 60/710,062, filed on Aug. 22, 2005.

(51) Int. Cl.
*H01J 40/14* (2006.01)
*G01J 5/02* (2006.01)

(52) U.S. Cl. .................. 250/239; 250/342; 250/DIG. 1

(58) Field of Classification Search .................. 250/239, 250/221, 342, 353, DIG. 1; 340/565
See application file for complete search history.

(56) References Cited

U.S. PATENT DOCUMENTS

| | | | |
|---|---|---|---|
| 3,653,021 A * | 3/1972 | Litman et al. | ............... 340/556 |
| 4,793,814 A | 12/1988 | Zifcak et al. | |
| 5,017,783 A | 5/1991 | Mousavi | |
| 5,026,990 A * | 6/1991 | Marman et al. | ............. 250/342 |
| 5,155,905 A | 10/1992 | Miller, Jr. | |
| 5,221,919 A | 6/1993 | Hermans | |
| 5,258,889 A | 11/1993 | Belanger, Jr. | |
| 5,393,256 A | 2/1995 | Mitchell et al. | |
| 5,497,305 A | 3/1996 | Pastrick et al. | |
| 5,763,830 A | 6/1998 | Hsueh | |
| D401,175 S | 11/1998 | Bender et al. | |

(Continued)

OTHER PUBLICATIONS

Patent Cooperation Treaty, Written Opinion of the International Searching Authority, PCT/US2006/32965, Jan. 19, 2007, 4 pages.

(Continued)

*Primary Examiner*—Thanh X Luu
(74) *Attorney, Agent, or Firm*—Marger Johnson & McCollom P.C.

(57) ABSTRACT

An occupancy sensor having a replaceable cover with a convenient adjustment and installation scheme is disclosed herein. More particularly, a single or multi-technology occupancy sensor, assembled inside a semi-spherical shaped enclosure includes a replaceable cover with a convenient adjustment and installation scheme. This sensor design enables the sensor to be rotated after installation to obtain a desired coverage patterns. Specifically, the housing for the occupancy sensor includes a front cover having a lens assembly, a base assembly, a harmonic wheel, and a back cover. The front cover couples to the base assembly such that tool-less, manual access is available through the manually removable cover assembly to adjust several features of the sensor. The harmonic wheel enables the front cover, which includes the lens to swivel from zero to 359 degrees relative to the back cover anytime after installation.

24 Claims, 10 Drawing Sheets

U.S. PATENT DOCUMENTS

| | | |
|---|---|---|
| D404,325 S | 1/1999 | Bender et al. |
| D404,326 S | 1/1999 | Bender et al. |
| 6,082,894 A | 7/2000 | Batko et al. |
| 6,155,887 A | 12/2000 | Cuff et al. |
| 6,222,191 B1 | 4/2001 | Myron et al. |
| 6,326,776 B1 | 12/2001 | Yoshiuchi et al. |
| 6,663,414 B2 | 12/2003 | Kume et al. |
| 7,195,381 B2 | 3/2007 | Lynam et al. |
| 7,306,493 B2 | 12/2007 | Seo et al. |
| 7,445,455 B2 | 11/2008 | Yokozuka et al. |
| 2003/0036365 A1* | 2/2003 | Kuroda ............... 455/90 |
| 2005/0043907 A1 | 2/2005 | Eckel et al. |
| 2006/0138329 A1 | 6/2006 | Wu et al. |
| 2006/0194504 A1 | 8/2006 | Ragonetti et al. |
| 2007/0030154 A1 | 2/2007 | Aiki et al. |
| 2007/0040676 A1 | 2/2007 | Bandringa et al. |
| 2007/0085755 A1 | 4/2007 | Webb et al. |
| 2007/0184679 A1 | 8/2007 | Schmid |
| 2007/0264849 A1 | 11/2007 | Steckler et al. |

OTHER PUBLICATIONS

Patent Cooperation Treaty, International Search Report, PCT/US2006/32965, Jan. 19, 2007, 3 pages.

Leviton, Low Voltage Switches, LIT-32712-00 Rev B, Tualatin, OR, Feb. 8, 2005, 2 pages.

Patent Cooperation Treaty, International Search Report, PCT/US2007/065523, Aug. 5, 2008, 1 page.

Sensor Switch Inc, "Specialty Power Packs", Wallingford, CT, Revised Dec. 21, 2004, 2 pages.

* cited by examiner

| ULTRASONIC SENSITIVITY | 👂 )) |
| AMBIENT LIGHT LEVEL ADJUSTMENT | ☀ |
| INFRARED SENSITIVITY | 👁 |
| DELAYED OFF TIME | ⏱ |

ADJUSTABLE LOW VOLTAGE OCCUPANCY SENSOR

This application claims priority from provisional application No. 60/710,062, filed Aug. 22, 2005.

FIELD OF THE INVENTION

The present disclosure relates to occupancy sensors and, more particularly, to a low voltage occupancy sensor.

DESCRIPTION OF THE RELATED ART

Occupancy sensors are designed to save energy by detecting the presence of a moving object in a specific predetermined area of coverage and switching a light source on and off depending upon the presence of the moving object. Specifically, when a moving object is detected within the area of coverage, the light source is turned on. In the alternative, when motion is not detected indicating that the area of coverage is not occupied, the light source is turned off after a predetermined period of time. Occupancy sensors are thus enabled to reduce electrical energy waste by taking over the functions of a light switch or an electrical outlet. The purpose of occupancy sensors is to keep the controlled lights on while an area is occupied and turn them off as soon as the area is unoccupied. Occupancy sensors rely on motion detection to make assumptions regarding the state of occupancy of a space. Each sensor has a particular field of view (FOV) for which it can detect motion. It is important that the FOV of one or more sensors entirely cover the usable area of a space so the motion from an occupant is detected.

A typical occupancy sensor design utilizes ultrasonic and passive infrared (PIR) or pyroelectric sensors technologies to sense motion. Some embodiments use only ultrasonic and others only PIR. Where only one technology is used, the occupancy sensor is known as a 'Single' technology occupancy sensor. Some embodiments use a combination of both these technologies to sense motion. This last type is called a 'dual' or 'multi' technology occupancy sensor. Dual technology sensors turn on the lights based on detection of motion and keep the lights on based on detection from either technology. The arrangement provides a greater immunity to false turn-on and false turn-off.

Occupancy sensors employ an array of Fresnel lenses covering an entrance aperture. In operation, thermal infrared radiation from the moving object of interest illuminates the lens array, wherein, for any particular angle of incidence, each lens in the lens array generates a focal spot. As the object of interest moves across the field of view of the array of lenses, the system of focal spots moves across the sensitive area of the sensor. As a result, the sensor generates a varying electrical output signal which is processed to yield information about the state of motion within the area of coverage.

Typically, occupancy sensors detect the presence of a moving object in a specific predetermined area defined by preset coordinates. There are, however, times when these coordinates in addition to other variables need adjustment. As such, a newly installed sensor may need a few adjustments to function optimally in a particular location. Current occupancy sensor designs, however, do not allow easy tool-less, manual access to adjust knobs and switches which are used to make adjustments to the sensor's performance. Most occupancy sensors require the use of a small screwdriver to remove an access cover to make adjustments. Sometimes tools are not readily available; and, even when these tools are accessible, the adjustment may require disassembly and reinstallation of a few parts including the body of the sensor. This type of adjustment is not only cumbersome and awkward, but damage may also occur during reassembly.

Specifically, installation of occupancy sensors requires forethought regarding the proper mounting and orientation. Sensors work best when they are pointed at the area of occupation. The coordinates of this area of occupation, however, are often not known at the time the sensor is installed. Often the occupancy sensor's orientation must be changed once the room becomes active, or when changes occur that modify the occupancy pattern of a room such as furniture arrangement, for example. Existing occupancy sensors, however, are not very forgiving in this case, because changing the orientation often requires the sensor to be partially disassembled and reassembled.

There are various means to accommodate the need for changing orientation. Some known occupancy sensor designs allow the installer to rotate the entire sensor including the mounting plate when installed using a threaded rod. The sensor, however, can only be rotated if the rod is not screwed in place tightly. In contrast, similar existing occupancy sensors will not allow rotation if mounted with screws.

Other known occupancy sensor designs allow the sensor to rotate only partially around the mounting plate when the mounting plate is affixed with screws. Thus, this design only allows a limited degree of rotation. To obtain certain positioning angles, the installer would be required to remove the mounting plate screws and reinstall the mounting plate to the new desired angle which is time-consuming.

Besides providing orientation accessibility, an occupancy sensor must allow easy access to the lens which is a key component of the occupancy sensor. The lens is made of a thin, soft plastic material, and has a highly sensitive surface. The location of the lens is typically in the center of the sensor to achieve maximum field of view and covers a large surface area of the sensor. Unfortunately, due to the relatively large exposed surface area of the lens, the lens may be scratched or damaged as a result of mishaps during shipping and handling or during installation. Accordingly, if the lens is damaged, the sensor will not perform optimally. In most known occupancy sensor designs, the entire sensor must be replaced when the lens is damaged. Removal and re-installation of sensors, however, is a time-consuming effort.

Alternatively, in some known occupancy sensor designs, the lens is kept in place by a small plastic ring. To remove the lens, this ring must be snapped out of the housing. Unfortunately, when the ring is snapped out, it is inevitable that the lens surface will be touched by the person removing the lens because of the small size of the ring. Thus, removal of the lens may possibly reduce lens performance due to oils and dirt introduced by the hands of the person removing the lens.

Thus, a need exists for an occupancy sensor that can be manual accessed without tools to allow an installer to adjust the various features of the sensor. Furthermore, there exists a need for an occupancy sensor that incorporates a simple installation and re-orientation scheme. Moreover, the sensor must enable easy access to the lens for changing a defective lens without damaging or mishandling the new lens.

The present invention is directed to overcoming, or at least reducing the effects of one or more of the problems set forth above.

SUMMARY OF THE INVENTION

To address the above-discussed deficiencies of occupancy sensors, the present invention teaches an occupancy sensor that enables tool-less, manual access to adjust several features of the sensor. More particularly, this invention allows for tool-less, manual adjustment of the various switches and knobs to change the settings of the sensor. Further, this occupancy sensor incorporates a simple installation scheme. In addition, the lens of the sensor is replaceable without changing the entire unit. Moreover, in order to provide additional protection for the lens, the size of the snap-on cover is substantially larger than the lens. Thus, when the cover is removed, the user's fingers are at a distance from the lens itself which minimizes the chance of the lens getting dirty while the unit is being serviced. The removable cover also gives the user the opportunity to change the color of the device to match the decor.

Another portion of this invention allows for the unit to be rotated easily depending on the desired orientation of the occupancy sensor which is achieved by allowing the base of the sensor to rotate approximately 360 degrees with respect to the back cover using a circular track with a harmonic gear-type profile similar to a sine wave. The occupancy sensor in accordance with the present invention may be rotated to accommodate desired coverage patterns. This profile allows for appropriate tactile and audio feedback to the user. Another feature of the sensor is that the back cover has four elongated slots in it to allow for the device to be mounted to a variety of electrical boxes or directly to the building structure where no electrical box is required.

Specifically, the housing for an occupancy sensor in accordance with the present invention includes a cover assembly having an aperture in which the lens assembly is seated. The housing includes a base assembly having a base, the harmonic wheel and a back cover where the harmonic wheel is sandwiched between the base and the back cover. The harmonic wheel within the base assembly enables the base to swivel around the base cover. The cover assembly couples to the base assembly such that the cover assembly is manually removable to allow an installer to make adjustments to the occupancy sensor.

The lens of the lens assembly may be either a Fresnel lens, a non-Fresnel lens, or a cap when no lens is required. In a possible application, the sensor's field of detection may be selectively blocked using a mask in conjunction with the lens. The lens holder of the device is designed such that any of the lens options may be incorporated.

In summary, this single or multi-technology occupancy ceiling sensor may be assembled inside a semi-spherical shaped enclosure wherein the cover assembly has a replaceable cover with a convenient adjustment and installation scheme. This design provides the ceiling sensor with two major features—easy installation and tool-less adjustment. In case, the lens gets scratched or damaged, the replaceable cover design allows for the installation of a new lens without the expense and need of replacing the entire sensor.

The foregoing has outlined, rather broadly, the preferred feature of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. While the present invention is embodied in hardware, alternate equivalent embodiments may employ, whether in whole or in part, firmware and software. Those skilled in the art should also realize that such equivalent constructions do not depart from the spirit and scope of the invention in its broadest form.

BRIEF DESCRIPTION OF THE DRAWINGS

Other aspects, features, and advantages of the present invention will become more fully apparent from the following detailed description, the appended claim, and the accompanying drawings in which:

DETAILED DESCRIPTION

The present invention will now be described with reference to the accompanying drawings, in which various embodiments of the invention are shown. This invention, however, may be embodied in many different forms and should not be construed as limited to the embodiments set forth herein. Rather, these embodiments are provided so that this disclosure will be thorough and complete, and will fully convey the scope of the invention to those skilled in the art.

The occupancy sensor in accordance with the present invention enables tool-less, manual access to the lens and control switches located on the base assembly of the sensor. The occupancy sensor is comprised of a cover assembly which connects to a base assembly. Removal of the cover assembly enables the user to adjust several features of the sensor. Specifically, a user is enabled to remove the front cover and manually adjust various switches and knobs to change the settings of the sensor at any point in time. Additionally, the occupancy sensor incorporates a simple installation scheme which further enables easy adjustment of the sensor. A harmonic wheel incorporated in the base assembly enables rotational movement of the sensor such that the sensor may substantially rotated from zero to substantially 359 degrees around its initial set position. Thus, the occupancy sensor in accordance with the present invention can rotate to accommodate various desired coverage patterns. There are several new improved features in the design of occupancy sensor 100 that are meant to improve upon prior art devices and allow universal mounting. These include, but are not limited to the front cover, a harmonic wheel, the back cover, and a lens holder.

Figure 1:
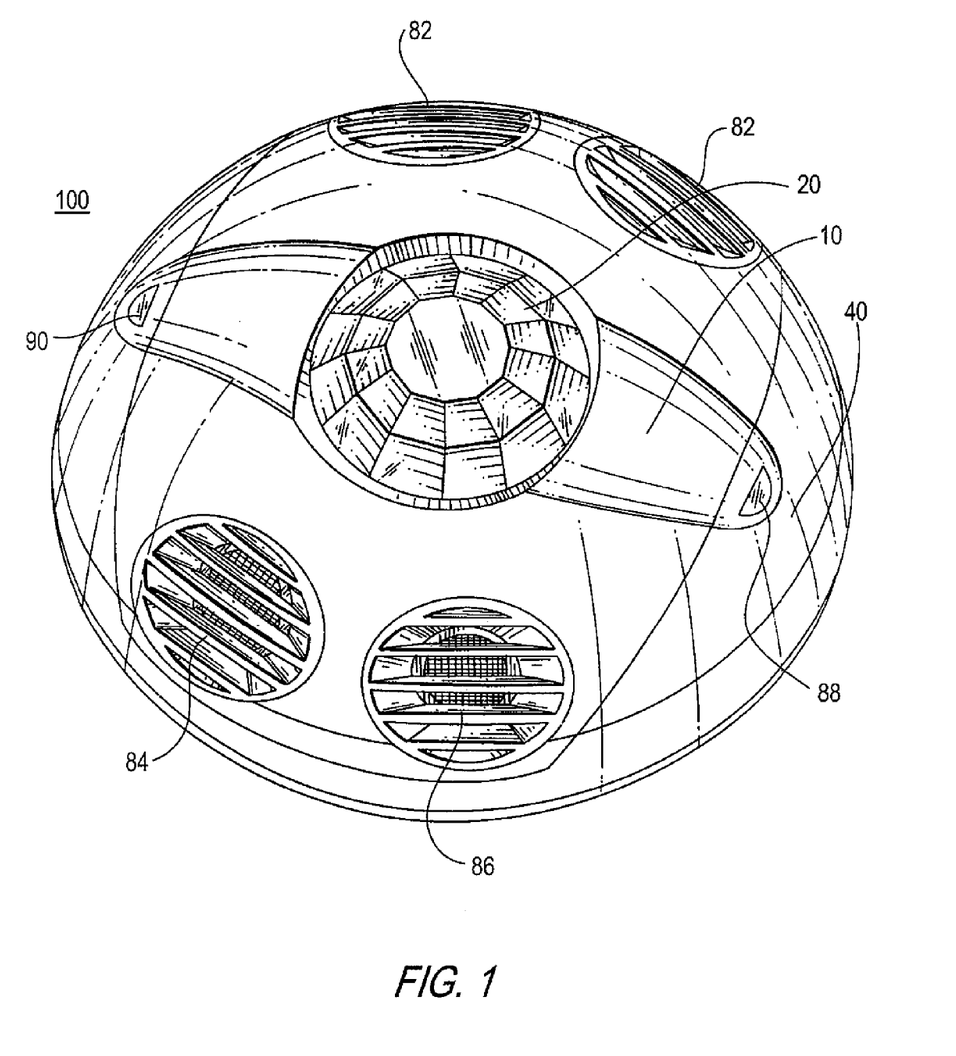
FIG. 1 shows ceiling occupancy sensor.

Referring to FIG. 1, occupancy sensor 100 includes housing made of two parts: a front cover 10 and a base assembly 40. A lens assembly 20 sits in the front cover 10. Circular vents or grates, 80, 82, 84 and 86, provide access to transducers beneath the grates to sense or transmit ultrasonic energy. Openings are provided in the cover for receiving the ends of light pipes which are provided to direct light to LED. Although a hemispherical shaped housing is shown, those skilled in the art will recognize that the physical variations in shape of the housing can be changed while retaining the function described above. For example, the sensor housing may be square, box shaped or elliptical.

In operation, the multitechnology two-way occupancy sensor 100 senses motion using both passive infrared (PIR) detectors (or pyroelectric sensors) and ultrasonic sensors. PIR detectors are sensitive to the temperature generated by a source of heat such as infrared energy from a human body. Humans, having a skin temperature of about 98 degrees F., radiate infrared energy with a wavelength between 9 and 10 micrometers. Therefore, the PIR sensors are typically sensitive in the wavelength range of 8 to 12 micrometers. More particularly, PIR detectors comprise simple electronic components similar to a photosensor, where the infrared light bumps electrons off a substrate, and these electrons can be detected and amplified into an electrical signal.

Ultrasonic detectors, on the other hand, emit ultrasonic waves that bounce off objects. The reflective wave, after hitting an object such as a human, will have a Doppler shift in both phase and frequency. Electronic circuitry within the ultrasonic detector filters the reflective wave and amplifies the Doppler shift to make a determination of whether the object is moving. A signal is then sent to a power pack that can include relay switches which are wired to control one or more lights.

Figure 2:
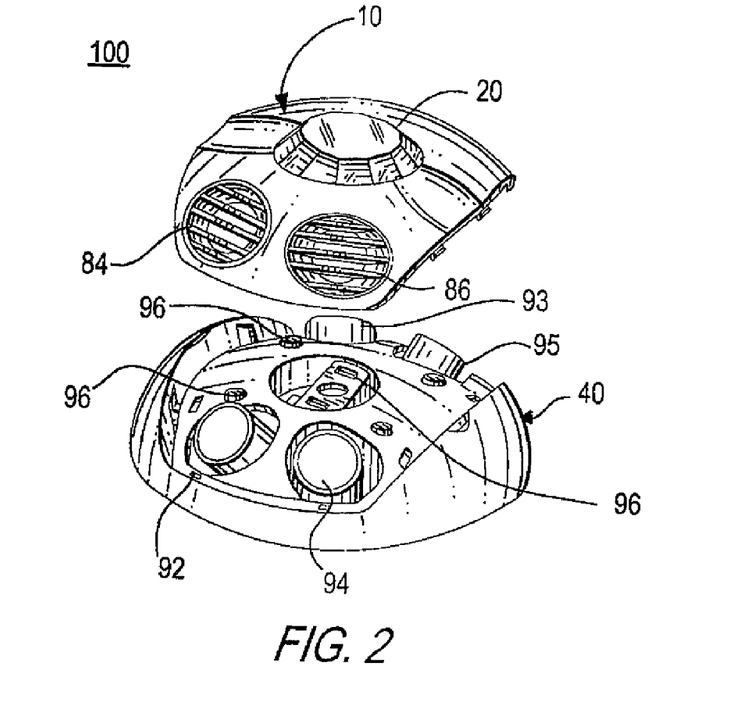
FIG. 2 shows an exploded view of the occupancy sensor.

Referring to FIG. 2, the exploded view of occupancy sensor 100 shows cover 10 removed from base assembly 40. As shown, circular vents 84 and 86 are openings for transducers 92 and 94, while circle vents, 80 and 82 (see FIG. 1), are openings for transducers 95 and 93, respectively. When the cover is removed, knobs and switches 96 are accessible for a user to adjust the various controls of the sensor 100. The structure shown utilizes a replaceable snap-in front cover 10. The snap-in front cover 10 is designed to be removed without the use of any tools and, when removed, reveals the dip switches and adjustment knobs 96. More disclosure on these user controls are provided below.

Referring to FIG. 2, lens 20 is held in place in the front cover 10 which can be easily removed without the use of tools. When lens 20 needs replacing, only the snap-in front cover 10 need to be replaced. The entire sensor does not have to be removed. Thus, the design of occupancy sensor 100 allows for a quick and easy replacement of the front cover 10 in case the lens 20 is damaged, becomes non-serviceable due to vandalism or any other cause, and must be replaced. The front cover 10 has a snap-on design that is easily affixed to and removed from the housing without the use of any tools. The nature of this 'tool-less' replacement design reduces the risk of injury to an installer.

Another feature of the sensor is that the front cover 10 is larger than the lens. The relatively large surface area of the cover 10 reduces the likelihood of the lens 20 being touched when adjustments and/or replacement to the sensor are being made. This feature helps keep the lens 20 free of dirt and oils from the hands of a user or installer. The removable front cover 10 can be quickly and easily replaced with a cover of a different color to provide a device which is compatible with different decors.

Figure 3:
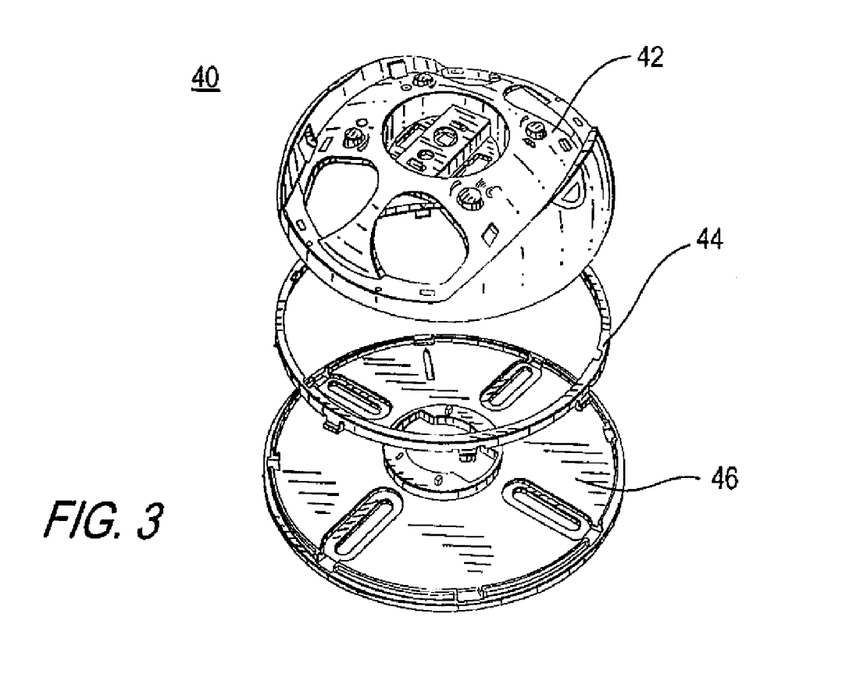
FIG. 3 shows an exploded view of the base assembly of the occupancy sensor.

FIG. 3 shows an exploded view of base assembly 40 which includes base 42, harmonic wheel 44 and back cover 46. The harmonic wheel 44 is located between the base 42 and the back cover to provide a no tool adjustment design. The base 42 of the sensor can be rotated between zero degrees and 359 degrees relative to the stationary back cover to allow the sensor to be rotated to a desired angle after the back cover has been permanently installed on a ceiling. Thus, the sensor can be rotated substantially 360 degrees regardless of the initial orientation of the sensor when it is installed or affixed to the building structure. The sensor is designed to mount only to ceilings and the cover rotated around its base to 'point' the transducers, 92, 93, 94 and 95 located within the base assembly (refer to both FIGS. 2 and 3), toward an area which will normally be occupied. Sensor 100 (see FIG. 10) has one set of transducers on only one side and is identified as a one-way version. Sensor 200 (see FIG. 11) has two sets of transducers on opposite sides and is identified as a two-way version. The different versions can provide a number of different detection patterns to help provide optimize performance, such as is normally useful for open spaces, hallways, and warehouse isles.

Figure 4:
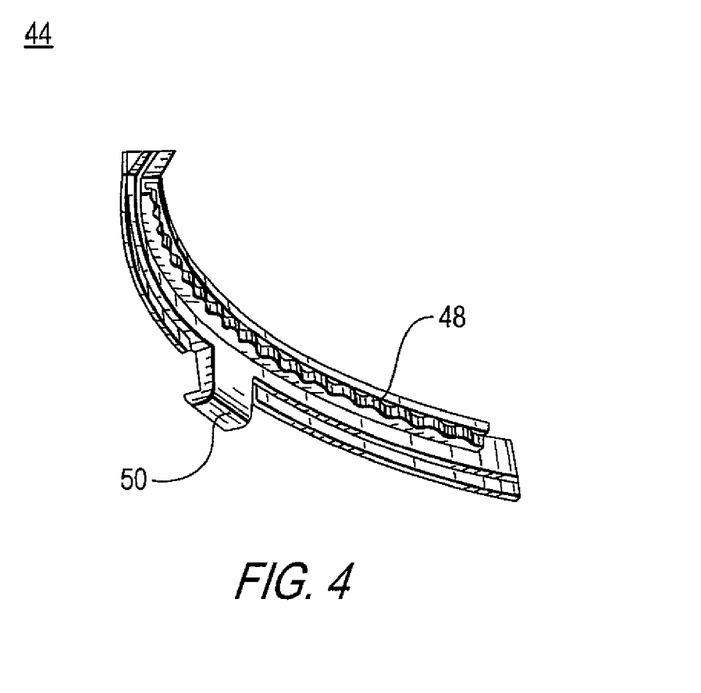
FIG. 4 shows the harmonic wheel.

FIG. 4 shows a sectional view of the harmonic wheel 44. As shown, projections or gears 48 have a sine wave like shape which helps provide proper balance between keeping the sensor in its desired orientation and allowing it to rotate in increments of 3 degree. This design provides for both large and small adjustments to the orientation of the sensor, and the sine wave-like design of the gears 48 provides both tactile and audible feedback to an installer.

Figure 5:
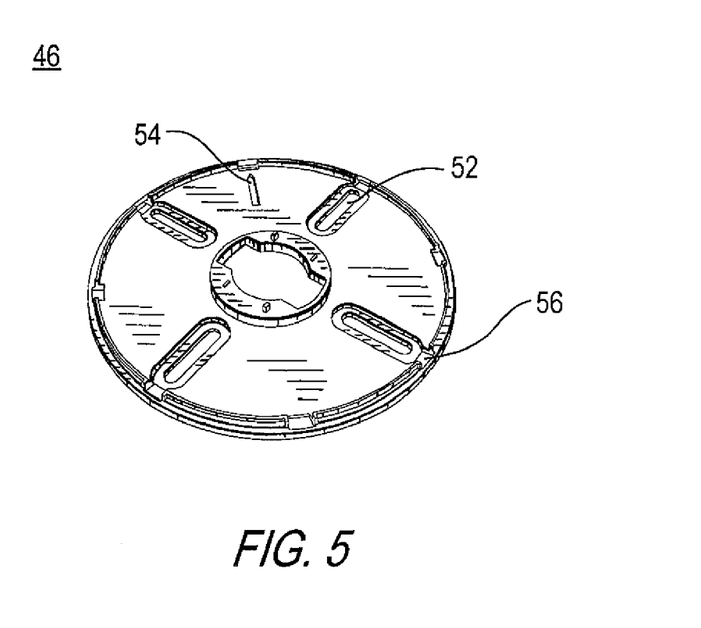
FIG. 5 shows the back cover.

Harmonic wheel 44 is designed to fit into the base 42 of the sensor 100 in only one location which simplifies the assembly and installation processes of the sensor. Referring to FIGS. 4 and 5, projection 50 slips into mounting hole 56 of back cover 46. Specifically, back cover 46 includes a relatively large center opening to accommodate a threaded rod (not shown) which may be attached to a cross bar for attaching the back cover to a ceiling. Four elongated mounting slots 52 separated by 90 degrees and oriented along the radius of the back cover are provided for installation using mounting screws (not shown).

The mounting holes 56 on the back cover 46 allow the back cover to be mounted directly to the following standard 1½" deep electrical boxes: 3½" round pan, 4" round pan, 3½" octagonal, 4" octagonal, 4" round raised covers with open ears, 4" square to round raised covers with open ears, and 4¹¹⁄₁₆" square raised cover with open ears (none of which are shown).

Electrical codes vary based upon region. Certain regions require that a low voltage sensor be installed in an enclosure, such as an electrical box. The occupancy sensor in accordance with this invention can accommodate direct mounting to many different varieties of electrical boxes. In addition, the sensor may be mounted on other electrical boxes using a commercially available adapter. Some regions allow the ceiling mounted occupancy sensors to mount directly to the building structure, without any enclosure. The occupancy sensor in accordance with the present invention can accommodate these types of installations as well. Thus, the back plate of the occupancy sensor can accommodate many different mounting scenarios. An additional mounting scheme may comprise the use of a 4 inch square box having a raised cover. Another application may incorporate the use of the occupancy sensor for raceway applications that are installed on a wallboard. Direct installation with screws to a standard raceway electrical box (i.e. Wiremold) is a viable option. The back cover 46 can be mounted to a standard crossbar with mounting screws. With a deeper size octagon box or square box having a raised cover with open ears, a supplied threaded rod can be attached to a standard crossbar which eliminates the need to use screws.

Figure 6:
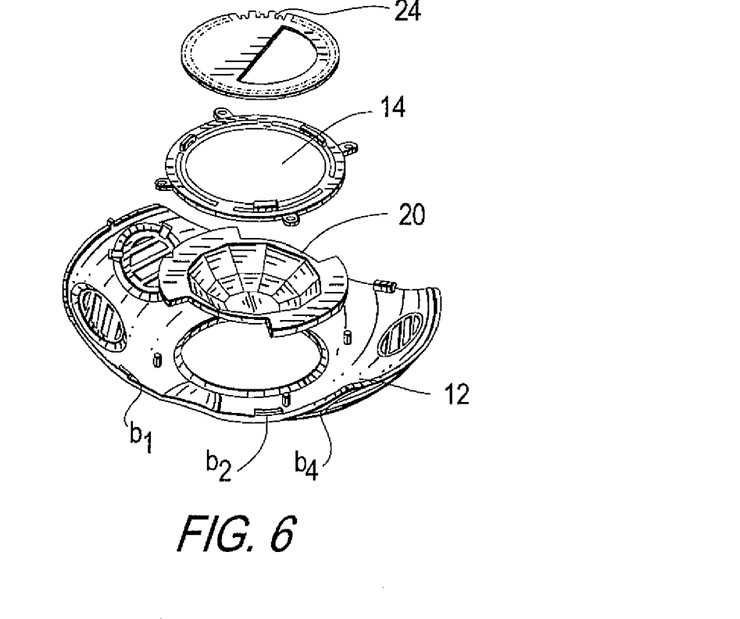
FIG. 6 shows an exploded view of the lens assembly.

FIG. 6 shows an exploded bottom view of the front cover and lens assembly. The cover 12 has a substantially centrally located aperture for receiving lens 20. Lens holder 14 is attached to and holds lens 20 in position in the cover 12. A mask 24 which is mounted onto lens holder 14 is used to mask a part of the coverage pattern.

Since several parts must be held in place on the front cover, holder 14 is designed to hold more than one part. With many variations available in occupancy sensors, there are some sensors that require the use of a Fresnel lens and others that do not. To avoid the need of having different covers for different version, lens holder 14 is designed to hold either the Fresnel lens 20 and, where desired, a mask, or in the alternative, only a cap 16. See FIG. 7 for applications where the Fresnel lens is not used. Referring to FIG. 6 where the Fresnel lens is used, the Fresnel lens 20 is held securely in place by the lens holder 14 which is non-removably secured to the front cover 12 by heat staking bosses located on the inside surface of the front cover 12. Heat staking includes the process of heating metal bosses ($b_1$, $b_2$, $b_3$, $b_4$) of the inside surface of the front cover and inserting the metal bosses in the plastic lens holder. Heat staking of threaded metal inserts into plastic is normally necessary since most thermo-plastics are too soft to sufficiently hold a thread. Brass or steel threaded inserts can be added. A mask 24 which is used with some sensors can be installed on the bottom side of the lens holder 14.

Figure 7:
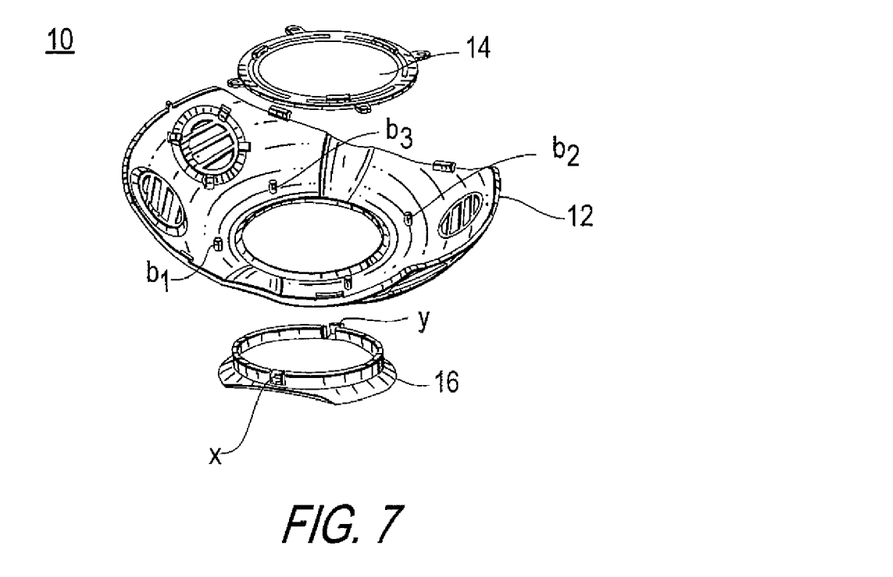
FIG. 7 shows an exploded view of a second embodiment of a lens assembly.

Referring to FIG. 7, there is shown an exploded view of the lens holder 14, front cover and cap 16. Initially, the ring shaped lens holder is securely connected to the inside surface of the front cover. Cap 16 is inserted and pressed into the opening in the front cover until snaps x, y on the cap are locked in place within the slots in the front cover 12 and the lens holder 14. Returning to FIG. 6, a mask 24 can be installed by the user to obtain a more specific coverage pattern. The mask 24 is mounted onto the top side of the ring shaped lens holder 14.

The lens holder here disclosed is a common part that has the functionality of several parts, thus reducing cost and assembly time. As shown in FIGS. 6 and 7, ring shaped lens holder 14 can engage at least three separate and distinct parts: the Fresnel lens 20 and the mask 24, or only the cap 16.

Figure 8:
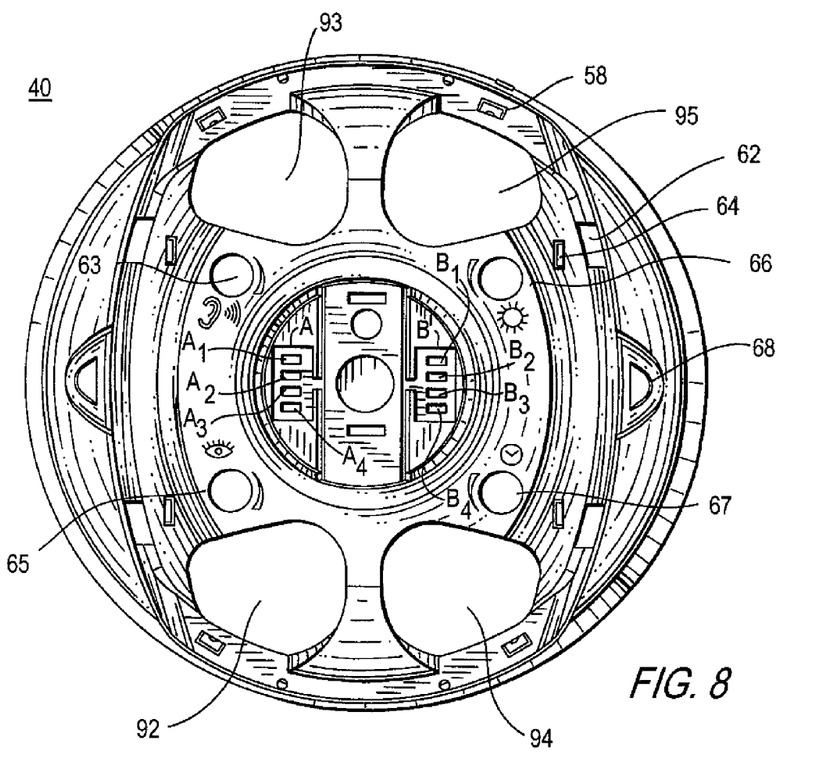
FIG. 8 shows the base assembly.
Figure 9:
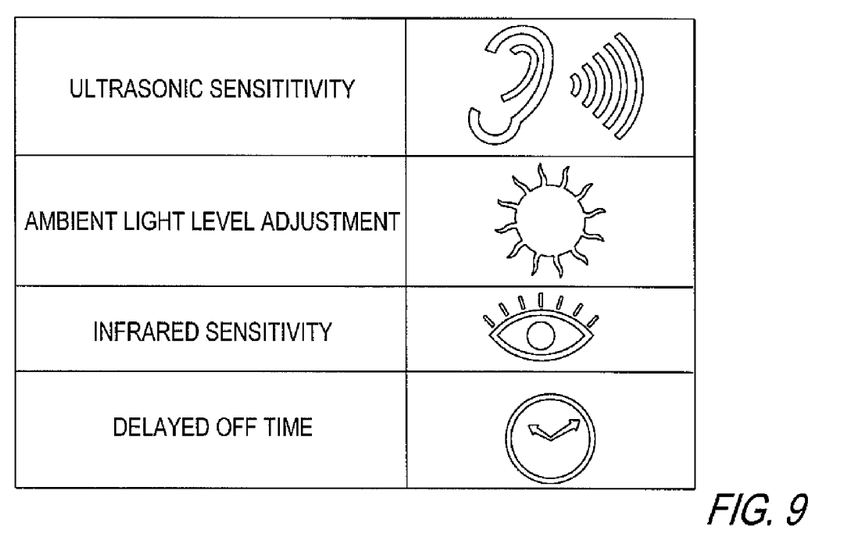
FIG. 9 shows the function adjust icon.

FIGS. 8 and 9, illustrate details of an embodiment of the base assembly 40 of an occupancy sensor. Slots 58, 62, 64 and 68 are situated to enable clasps of the front cover 10 (FIGS. 6 and 7) to connect securely to base assembly 40. In addition to the slots, a number of user controls are provided such as four adjustment knobs (potentiometers), 63, 65, 66 and 67, and two 4-position dip switches, A [SW-A1, SW-A2, SW-A3, SW-A4] and B[SW-B1, SW-B2, SW-B3, SW-B4]. The adjustment knobs can provide ultrasonic sensitivity 63, infrared sensitivity 65, ambient light adjustment 66 and time delay 67. FIG. 9 shows icons which indicate the associated function adjustment. time delay knob 67 provides a selection of the basic time delayed selection for a specific period of time that the sensor waits before switching the light ON and OFF. Selections can include 30 sec., 5 min., 10 min., 20 min. and 30 min. The ambient light knob 66 sets the light level for which the lights will remain off when there is natural light available. The infrared sensitivity knob 65 adjusts the sensitivity of the PIR circuit which alters the gain. The ultrasonic sensitivity knob 63 changes both gain and threshold of the ultrasonic circuit/signal analysis.

Further, there can be 8 dip switches (not shown) that provide enhanced functionality. The first switch SW-A1 switches the sensor from 'single' to 'multi' technology mode. When switch SW-A1 is Off, sensor 100 is in 'multi' technology (multi-tech) mode. When switch SW-A1 is On, sensor 100 is in Single Tech Mode. Switch SW-A1 is available in the multi-tech embodiments, 100 and 200 (see FIG. 10), only. Switch SW-A1 can be used for locations where one technology does not perform well, and for diagnostics. Switch SW-A2 switches the sensor from the PIR detector to the Ultrasonic detector. When switch SW-A2 is Off, sensor 100 uses the PIR detector. When switch SW-A2 is On, sensor 100 uses the ultrasonic detector. Accordingly, switch SW-A2 is only available in the multi-tech embodiments, 100 and 200. In addition, switch SW-A1 must be On for switch SW-A2 to be operative. Specifically, switch SW-A1 selects which technology is used during Single Tech mode. This selected technology is the only technology that is used to turn on and maintain the lights. Switch SW-A3 provides for a manual mode, wherein when switch SW-A3 is Off, auto-adapting is enabled, and when SW-A3 is On, auto-adapting is disabled. This feature includes delayed off time and time of day adapting. Switch SW-A4 provides a walk-thru disable wherein when switch SW-A4 is Off, the disable is Off, which means the walk-thru feature is On. The walk-thru feature enables the occupancy sensor to be less sensitive than the normal mode of operation. The walk-thru feature is for placement of the occupancy sensor in highly trafficked areas such as a hall. This feature is necessary when a sensor is positioned in an office where one seeks to limit the sensitivity of the sensor after hours while custodial workers are present in the halls. In the converse, when switch SW-A4 is On, the disable is On, which means the walk-thru feature is Off. Switch SW-B1 provides an override to On feature, when switch SW-B1 is On, the lights are forced On. When switch SW-B1 is Off, the sensor 100 is in Auto Mode. Conversely, switch SW-B2 provides an override to Off feature, wherein when switch SW-B2 is Off, the sensor 100 is in auto mode. When switch SW-B2 is On, the lights are forced Off. Switch SW-B3 provides a walk test that enables a test mode. When switch SW-B3 is switch in the following sequence: OFF, ON, OFF, sensor 100 enters a test mode. The same sequence must be used to exit this test mode. Adaptive Settings are reset when entering test mode. Switch SW-B4 provides an LED Disable. When switch SW-B4 is Off, the LED disable is off, which means that the LEDs will remain On. When switch SW-B4 is ON, the LED disable is On, which means that the LEDs will remain Off.

As previously discussed, the sensor generates a varying electrical output signal which is processed to yield information about the state of motion within the area of coverage. This electrical output signal is fed to a microcontroller which samples the signal with a 1 KHz sampling rate. A digital bandpass filter with an 80 KHz center frequency filters this sampled signal. This filtered signal is then passed through a peak detector. The output of the peak detector is applied to both a lowpass filter and a narrow bandpass filter. The DC value of the signal is extracted to generate a threshold. The output of the peak detector is fed to a lowpass filter to get the DC value. In addition, the output of the peak detector is fed to a second lowpass filter to smooth the signal. A threshold is established based on this DC value. The AC component of the signal is extracted using a narrow bandpass filter centered around 20 Hz. The value of the threshold is corrected based on a number of factors, including the adjustment potentiometer, occupancy state, and history collected by the weekly monitoring cycle. The threshold, after all corrections have been taken into account, is compared with the AC component of the signal. When the AC component is greater than the threshold, an occupancy event is generated.

There are eight ceiling sensor embodiments in three basic categories: PIR only, ultrasonic only, and multitechnology. The multitechnology embodiments include each feature previously described with each associated switch, SW-A and SW-B. The other models have some features removed based on there being a single technology unit and the particular technology involved. There are two PIR only models, Extended range and High density. Each sensor has a different lens providing a different FOV.

Figure 10:
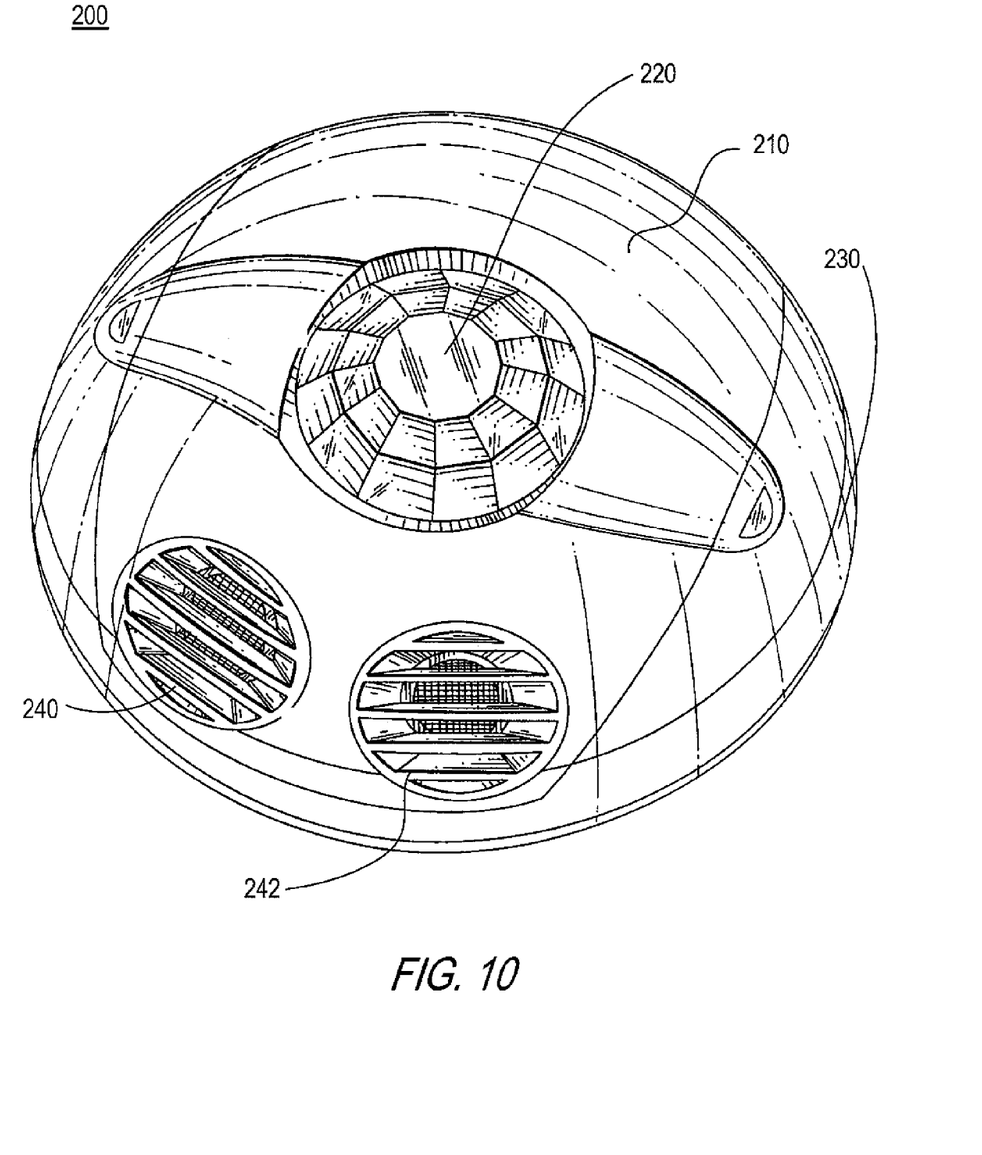
FIG. 10 shows a one-way ceiling occupancy sensor.

FIGS. 10, 11, 12, and 13 show four different embodiments. Three of the embodiments are multi-technology sensors which include a one-way having a 500 sq. ft range; two-way having a 1000 sq. ft range; and a two-way having a 2000 sq. ft range. These embodiments have an FOV that are a composite of the extended range of the PIR embodiment and that of the three different ultrasonic embodiments. Specifically, the first embodiment of the occupancy sensor 100 in accordance with the present invention as shown in FIG. 1 is a multi-technology two-way occupancy sensor. The FOV of this sensor covers a range of 360 degrees around both sides of the sensor, while the one-way occupancy sensor 200 of FIG. 10 only covers 180 degrees FOV on one side of the sensor. The two-way embodiment 100 has two pairs of transducers, one pair on each side, covering 360 degrees. FIG. 10 shows a multi-technology one-way occupancy sensor 200 where cover 210 has lens assembly 220 which connects to base assembly 230. Cover 210 includes grates, 240 and 242. As shown, this one-way embodiment 200 has a cover 210 with only one set of grates, 240 and 242.

Figure 11:
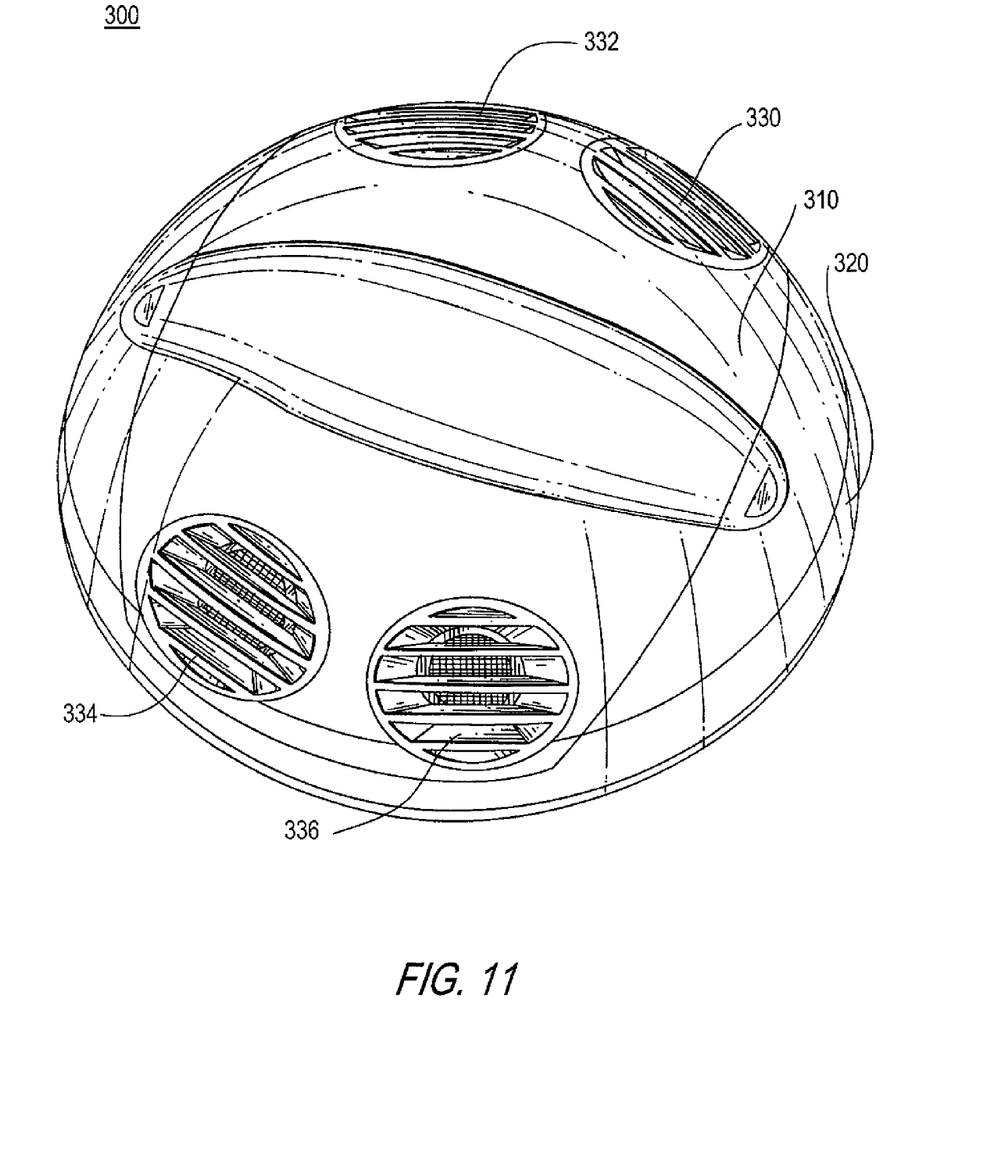
FIG. 11 shows an ultrasonic two-way ceiling occupancy sensor.
Figure 12:
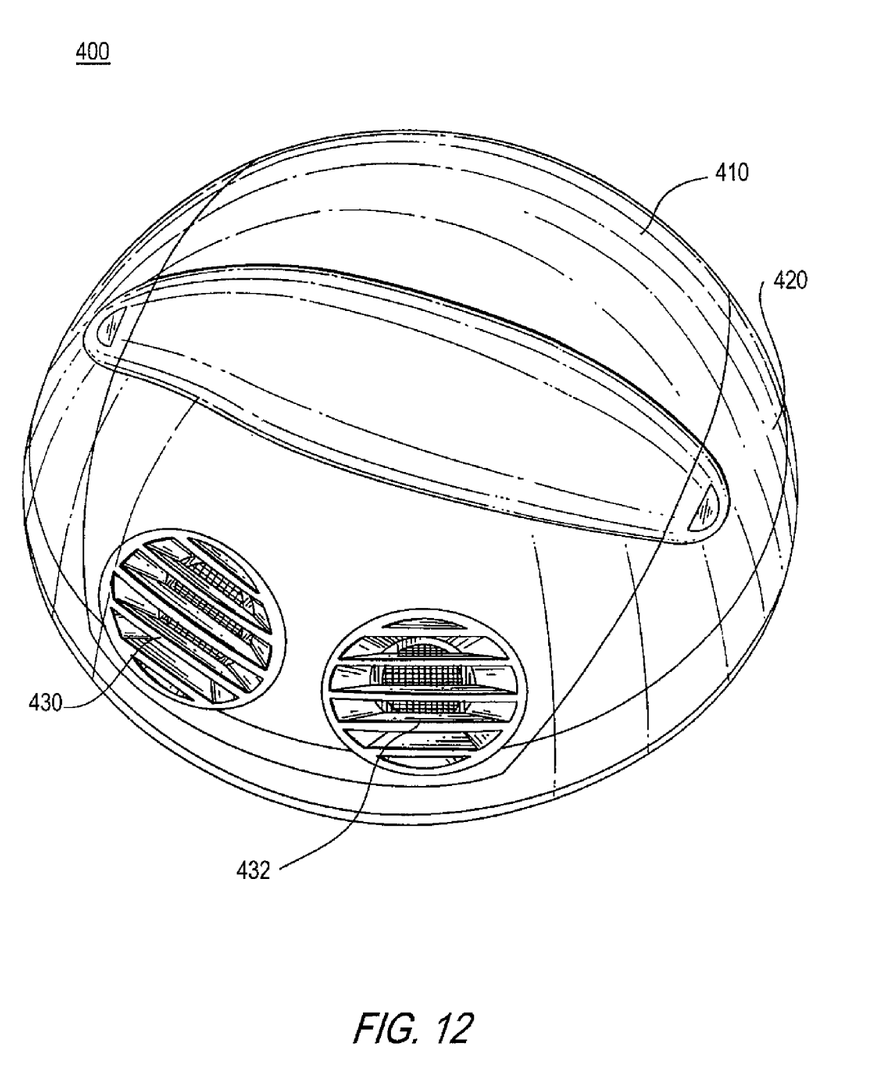
FIG. 12 shows an ultrasonic one-way ceiling occupancy sensor.

There are three ultrasonic only embodiments which include: 1-way, (having a 500 sq. range); 2-way, (having a 1000 sq. ft range); and 2-way, (having a 2000 sq. ft. range). The one-way embodiment has only one pair of ultrasonic transducers. The FOV of this ultrasonic only embodiment covers only 180 degrees on one side of the sensor. The one-way embodiment has a cover with only one set of grates. The two-way embodiments have two pairs of transducers, one pair on each side, covering 360 degrees. The embodiment of a sensor covering a 2000 sq. ft. range is the same as the other ultrasonic only embodiments, except it uses 32 KHz transducers to gain extra range. The other ultrasonic only sensors operate at 40 KHz. Several features are not present in the ultrasonic only embodiments which includes the use of switches, A1 and A2, to provide multi-technology to enable the PIR circuitry. Specifically, FIG. 11 shows an ultrasonic two-way occupancy sensor 300 that includes a cover 310 having grates 330-336 and which connects to base assembly 320. FIG. 12 displays an ultrasonic one-way occupancy sensor 400 that includes a cover 410 having grates 430 and 432 and is connected to base assembly 420.

In operation, ultrasonic sensors 300 and 400 detect the Doppler shift of a reflected signal. When a sound wave hits a moving object, the reflected sound is created. This reflected wave has a slight shift in frequency from the incident wave. This shift is detected by passing the received signal through a demodulator to create a signal whose voltage is proportional to the shift in frequency. In particular, the ultrasonic sensor may have one or two sets of transmitters and receivers. Sensor 400 has one set( one transmitter and one receiver) while sensor 300 has two sets. The transmitters are connected in parallel and the receiver outputs are summed. Thus, an analysis of one set is sufficient. The ultrasonic transmitter produces ultrasonic waves of a particular frequency. These waves reflect off various objects in the space (walls, furniture, people, etc. . .) and the reflected waves are detected by the ultrasonic receiver. Reflections from inanimate objects have the same frequency as the transmitted waves. Reflections from moving objects are detected with a different frequency. The difference in frequency is in the range of 1% or less considering the speed of sound, frequency of operation and the velocity of human motion. The received signal is a sine wave with frequency and amplitude modulation. This signal must be demodulated to remove the carrier and leave the amplitude and frequency demodulation. The received signal will always have some amplitude modulation due to all of the reflections from stationary and moving objects. In a room without airflow or moving objects, the amplitude modulation will remain fairly constant and when averaged over time will produce zero output. When motion is present there will be greater amplitude modulation, but it is not enough to reliably detect motion over distance. The frequency modulation will provide small changes that can be more reliably amplified.

Figure 13:
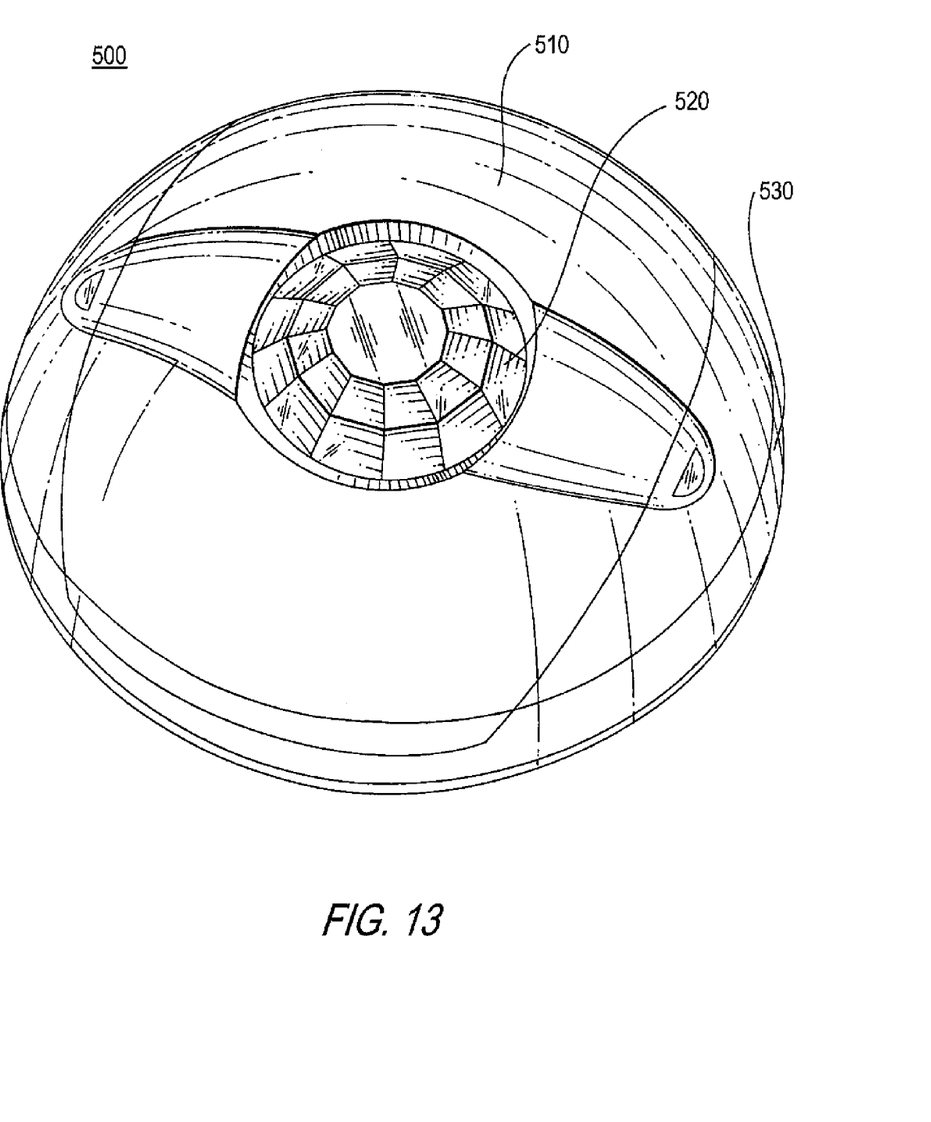
FIG. 13 shows a PIR only ceiling occupancy sensor.

FIG. 13 shows a passive infrared (PIR) only occupancy sensor 500 that includes a cover 510 having a lens 520 which extends out from the top surface, and a base assembly 530. As shown, the PIR only embodiments have a cover with no grates. Several features are not present in PIR only embodiments such as those which relate to multi-technology, environmental adapting and ultrasonic circuitry.

In operation, PIR technology uses a pyroelectric sensor in conjunction with an array of Fresnel lenses to detect heat from a moving person. The output of the pyroelectric sensor is amplified and filtered to provide a signal that sits at a DC reference voltage. The signal has an AC characteristic when the pyroelectric sensor produces an output. This signal is processed by a microcontroller's built in A/D converter. If the signal voltage is outside of a determined window, the interpretation is that motion exists. The actual value of the window (or threshold) depends on the state of the sensor. When the lights are off, the window will be larger, and when the lights are on, the window will be smaller. The minimum window size is determined empirically by measurement.

Figure 14:
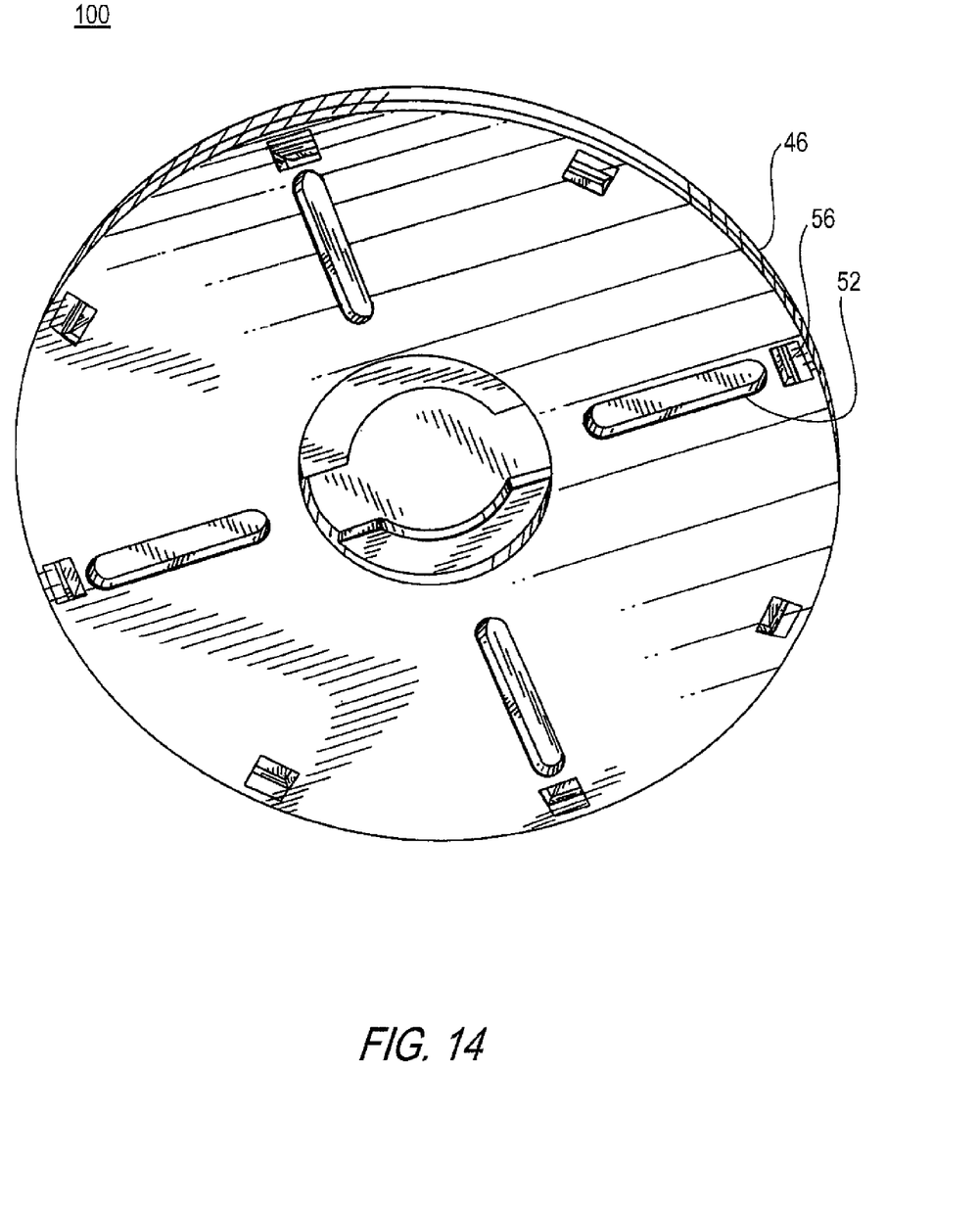
FIG. 14 shows the back cover of the ceiling occupancy sensor.

FIG. 14 shows the back cover of the various embodiments of occupancy sensors 100, 200, 300, 400 and 500.

In summary, advantages of this design of the sensors disclosed include but are not limited to an occupancy sensor that saves time and expense during installation and adjustment through the enablement of a tool-less, manually removable cover assembly to adjust settings of the sensor and/or remove the lens assembly. When the lens gets scratched or damaged, the replaceable front design allows for the installation of a new lens without the expense and need of replacing the entire sensor. During installation, the sensor can be manually rotated to any position which further amounts to savings in time and expense.

All the features disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The terms and expressions which have been employed in the foregoing specification are used therein as terms of description and not of limitation, and there is no intention in the use of such terms and expressions of excluding equivalents of the features shown and described or portions thereof, it being recognized that the scope of the invention is defined and limited only by the claims which follow.

What is claimed is:

1. An occupancy sensor comprising:
   a front cover having an opening;
   a lens assembly coupled to and located in the opening of the front cover, wherein the lens assembly comprises:
      a ring shaped member;
      a fresnel lens coupled to a side of the ring shaped member,
      wherein the ring shaped member and the fresnel lens are non-removably coupled to the front cover;
   a back cover; and
   a base assembly, having a radiation detector, the base assembly is coupled to the front cover and is rotatably coupled to the back cover to provide greater than 90 degree angular orientation to the lens assembly by manually rotating the front cover.

2. The occupancy sensor of claim 1 wherein said back cover is adapted to be coupled to a ceiling.

3. The occupancy sensor of claim 2 wherein said back cover comprises:
a central opening.

4. The occupancy sensor of claim 2 wherein said back cover comprises:
at least two elongated mounting slots each located along a radius of the back cover for receiving screws for coupling the back cover directly to an electrical outlet box.

5. The occupancy sensor of claim 4 wherein said back cover has four elongated mounting slots equally spaced around the cover and each located along a radius of the back cover.

6. The occupancy sensor of claim 1 wherein the ring shaped member is heat staked to the inside surface of the front cover.

7. The occupancy sensor of claim 1 further comprising: a mask coupled to a second side of the ring shaped member.

8. The occupancy sensor of claim 1 wherein the fresnel lens extends thru the opening and beyond the outside surface of the front cover.

9. The occupancy sensor of claim 1 wherein the lens assembly comprises:
an opaque cap; and
a ring shaped member coupled to the inside surface of the front cover adjacent to the opening for frictionally receiving the opaque cap.

10. The occupancy sensor of claim 9 wherein the opaque cap comprises a flange which abuts the outside surface of the front cover when the cap is inserted into the ring shaped member from the outside surface of the front cover.

11. The occupancy sensor of claim 1 wherein the greater than 90 degree angular orientation of the lens assembly is constrained about an axis.

12. The occupancy sensor of claim 1, wherein the lens assembly is manually rotatable greater than 90 degrees without disassembly and manually removable from the base assembly without the use of tools.

13. The occupancy sensor of claim 1, wherein the front cover is manually rotatable greater than 90 degrees without disassembly and manually removable from the base assembly without the use of tools.

14. The occupancy sensor of claim 13, wherein the front cover may be snapped into place on the base assembly and manually rotated greater than 90 degrees without disassembly.

15. An occupancy sensor comprising:
a front cover having an opening;
a lens assembly coupled to and located in the opening of the front cover;
a back cover;
a base assembly, having a radiation detector, the base assembly is coupled to the front cover and is rotatably coupled to the back cover to provide greater than 90 degree angular orientation to the lens assembly by manually rotating the front cover; and
a harmonic wheel positioned between the back cover and the base assembly to allow the base assembly and front cover to rotate relative to the back cover.

16. The occupancy sensor of claim 15 wherein the rotation of base assembly and front cover relative to the back cover is between 359 degrees and zero degrees.

17. The occupancy sensor of claim 15 wherein the harmonic wheel has shaped projections to allow the base assembly and front cover to be manually rotated relative to the back cover in discrete increments.

18. The occupancy sensor of claim 16 wherein the discrete increments are substantially three degrees.

19. The occupancy sensor of claim 17 wherein the shaped projections are of a sine wave like configuration.

20. The occupancy sensor of claim 17 wherein the harmonic wheel is non- rotationally coupled to the back cover.

21. The occupancy sensor of claim 20 wherein the harmonic wheel includes a projection which engages a receiving opening in the back cover to lock the harmonic wheel to the back cover in non-rotational relationship.

22. An occupancy sensor comprising:
a front cover having an opening;
a lens assembly coupled to and located in the opening of the front cover;
a back cover, wherein said back cover comprises:
at least two elongated mounting slots each located along a radius of the back cover for receiving screws for coupling the back cover directly to an electrical outlet box; and
a base assembly, having a radiation detector, the base assembly is coupled to the front cover and is rotatably coupled to the back cover to provide greater than 90 degree angular orientation to the lens assembly by manually rotating the front cover.

23. The occupancy sensor of claim 22 wherein said back cover has four elongated mounting slots equally spaced around the cover and each located along a radius of the back cover.

24. An occupancy sensor comprising: a front cover having an opening; a lens assembly coupled to and located in the opening of the front cover; a back cover; and a base assembly, having a radiation detector, the base assembly is coupled to the front cover and is rotatably coupled to the back cover to provide greater than 90 degree angular orientation to the lens assembly by manually rotating the front cover, wherein the greater than 90 degree angular orientation of the lens assembly is constrained about an axis that is perpendicular to the back cover; and a harmonic wheel positioned between the back cover and the base assembly to allow the base assembly and front cover to rotate relative to the back cover.

* * * * *